3,525,752
MAKING TETRATHIASPIRO COMPOUNDS
John J. D'Amico, Dunbar, and Robert H. Campbell, St. Albans, W. Va., assignors to Monsanto Company, St. Louis, Mo., a corporation of Delaware
No Drawing. Continuation-in-part of application Ser. No. 558,587, June 20, 1966. This application Feb. 5, 1968, Ser. No. 702,818
Int. Cl. C07d 69/00, 79/00; C08c 11/60
U.S. Cl. 260—327          3 Claims

ABSTRACT OF THE DISCLOSURE

Making tetrathiaspiro compounds by reacting cyclic esters of cyanodithioimidocarbonic acid, or the corresponding urea, with alkylene or phenylene dithiols in alcoholic hydrogen chloride. The products react with dithiols, by which reaction unsymmetrical tetrathiaspiro compounds can be produced. The tetrathiaspiro compounds are useful for accelerating vulcanization of rubber.

This application is a continuation-in-part of copending application Ser. No. 558,587 filed June 20, 1966, and now abandoned.

The present invention relates to a process of making tetrathiaspiro compounds and to the products produced.

In accordance with the present invention, it was discovered that reaction of cyclic esters of cyanodithioimidocarbonic acid with mercaptans and alcoholic hydrogen chloride yielded tetrathiaspiro compounds. Use of an alkane dimercaptan produced tetrathiaspiroalkanes of the formula

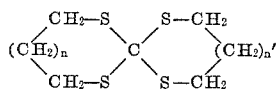

where $n$ and $n'$ are integers from zero to ten, inclusive. If $n'$ in the alkane dimercaptan, $HSCH_2(CH_2)_{n'}—CH_2SH$, was the same as $n$ in the cyclic ester, symmetrical tetrathiaspiroalkanes resulted; but reaction of different dimercaptans produced unsymmetrical tetrathiaspiroalkanes. The cyclic ester of cyanodithioimidocarbonic acid could be replaced by the corresponding urea in the reaction. Also, the tetrathiaspiro compounds reacted with dimercaptans, by which reaction symmetrical tetrathiaspiroalkanes were converted to unsymmetrical tetrathiaspiroalkanes. Suitable dimercaptans comprise 1,2-ethanedithiol, 1,3-propanedithiol, 1,4-butanedithiol, 1,6-hexanedithiol, 1,8-octanedithiol, 1,10-decanedithiol, and o-phenylenedithiol. It is preferred to use about equal molecular proportions of dimercaptan and cyclic ester of cyanodithioimidocarbonic acid or corresponding urea or tetrathiaspiro compound.

Cyclic esters of cyanodithioimidocarbonic acid and corresponding ureas useful in the process may be prepared by reacting a salt of cyanodithioimidocarbonate with an alkylene dihalide as described in copending application Ser. No. 558,593 of John J. D'Amico. For example, condensation of potassium cyanodithioimidocarbonate (I) [A. Hantzsch and M. Wolvkamp, Ann., 331, 265 (1904)] with 1,2-dibromoethane or 1,3-dibromopropane furnished 2-cyanoimino-1,3-dithiolane (II) and 2-cyanoimino-1,3-dithiocyclohexane (III) in yields of 83.3 and 69.6%, respectively. Other alkylene dihalides may be used, as for example 1,4-dibromobutane, 1,6-dibromohexane, and 1,10-dibromodecane.

In the absence of mercaptan, reaction of II with an excess of hydrogen chloride-methanol solution at 25°–30° C. for a period of 24 hours gave 1-(1,3-dithiocyclopentylidene)urea hydrochloride (IV) in 76.5% yield. The neutralization of IV with ammonium hydroxide furnished 1-(1,3-dithiocyclopentylidene)-urea (V) in 60.5% yield. However, V was obtained in an overall yield of 77.7% by combining these two reactions. Proof of structure for V was based on elemental analysis, infrared, and N.M.R. spectra.

Although it was anticipated that reactions of III with hydrogen chloride-methanol would have yielded the corresponding urea, the product which formed was 1,5,7,11-tetrathiaspiro[5.5]-undecane (VI) in 58% yield. The yield was increased from 58% to 90% by conducting the reaction in the presence of 1,3-propanedithiol. The product (VI) was prepared by Johnston et al. in 33% yield by the reaction of 2,2′-iminodiethanol with trimethylene trithiocarbonate, T. P. Johnston et al., J. Org. Chem. 27, 4068 (1962). Where the urea is desired, it is preferred to confine the reaction temperature to 25°–40° C. However, temperatures of 60°–80° C. are preferred for reaction with dimercaptans to produce tetrathia compounds. For example, 1,4,6,9-tetrathiaspiro[4.4] nonane (VII) was prepared by reacting II and 1,2-ethanedithiol at 65°–73° C. as described in Example 2 infra. When the procedure was repeated except the reaction mixture was stirred at 25°–30° C., the urea (V) was obtained in 69% yield.

EXAMPLE 1

1,5,7,11-tetrathiaspiro[5.5]undecane (VI)

To 240 grams (2.4 moles) of 36.5% hydrogen chloride-methanol solution at 5° C., 63.5 grams (0.4 mole) of III was added in one portion. Within a few minutes a solution resulted. The solution was stirred at 25°–30° C. for 18 hours. After cooling the resulting slurry to 0° C., 250 ml. of cold water was added dropwise at 0°–10° C. over a 15-minute period. To the stirred slurry, 164 grams of concentrated ammonium hydroxide was added dropwise at 0°–10° C. After stirring at 25°–30° C. for one hour, the precipitate was collected by filtration, washed with water until the washings were neutral to litmus, and air-dried at 25°–30° C. The filtrate contained a small amount of an offensive-smelling liquid which was identified as 1,3-propanedithiol. The product (VI), M.P. 113°–116° C., was obtained in 58% yield. After recrystallization from ethyl alcohol, it melted at 119°–120° C. The infrared spectrum as determined in chloroform and dimethylformamide contained bands at 2980 (m.) and 2900 (m.) (C—H st.), 1422 (s.) and 1410 (m.) ($CH_2$ def.), 1272 (s.), 1002 (m.), 910 (m.), 882 (m.), 774 (s.), and 743 (s.) cm.$^{-1}$. The N.M.R. spectrum in $CDCl_3$ was identical to that reported by Johnston and co-workers.

To 70.2 grams (0.702 mole) of 36.5% hydrogen chloride-methanol solution at 5° C., 37 grams (0.234 mole) of III and 25.5 grams (0.234 mole) of 1,3-propanedithiol were added in one portion. After the removal of ice cooling, an exothermic reaction set in causing a temperature rise from 7° to 33° C. and in addition, a precipitate resulted. The reaction mixture was stirred at 25°–30° C. for 18 hours. After cooling to 0° C., 250 ml. of water was added dropwise at 0°–10° C. To the stirred reaction mixture 63 grams of concentrated ammonium hydroxide was added dropwise at 0°–10° C. The remainder of the procedure was identical to that described in the first paragraph of this eaxmple. The product VI, M.P. 116°–118° C., was obtained in 90.0% yield. After recrystallization from ethyl alcohol, it melted at 119°–120° C. A mixture melting point with the product obtained from the method described above without 1,3-propanedithiol was not depressed, and the infrared spectra of the two were superimposable. Analysis gave 57.16% sulfur as compared to 57.15% calculated for $C_7H_{12}S_4$. The mass spectrum of VI was in conformity with the structure assigned.

EXAMPLE 2

1,4,6,9-tetrathiaspiro[4.4]nonane (VII) from II

To 100 grams (1.0 mole) of 36.5% hydrogen chloride-methanol solution at 5° C., 36.1 grams (0.25 mole) of II, and 23.5 grams (0.25 mole) of 1,2-ethanedithiol were added in one portion. After the removal of ice cooling, an exothermic reaction set in causing a temperature rise from 5° to 55° C. The stirred reaction mixture was heated at 65°–73° C. for 22 houas. After cooling the stirred reaction mixture to 0° C., 200 ml. of water was added dropwise at 0°–10° C. in 15 minutes. This was followed by the dropwise addition of 75 grams of concentrated ammonium hydroxide at 0°–10° C. over a 15-minute period. After stirring the reaction mixture at 0°–10° C. for 30 minutes the percipitate was collected by filtration and air-dried at 25°–30° C. The product VII, M.P. 139°–141° C., was obtained in 46.9% yield. After recrystallization from ethyl acetate, it melted at 142–143° C. The infrared spectrum as determined in chloroform and dimethylformamide contained bands at 2980(m) and 2900(m.) (C—H st.), 1417(m.) (CH$_2$ def.), 1272(s.), 966(m.), 948(m.), 799(vs.), and 758(s.) cm.$^{-1}$. The N.M.R. spectrum in CDCl$_3$ had a sharp singlet at 3.43 p.p.m. ($\delta$) due to equivalent methylene groups. Analysis gave 30.40% carbon, 4.00% hydrogen, 65.31% sulfur, and a molecular weight of 196 as compared to 30.58% carbon, 4.11% hydrogen, 65.31% sulfur, and a molecular weight of 196.4 calculated for C$_5$H$_8$S$_4$. The mass spectrum of VII was in conformity with the structure assigned.

The bottom organic layer of the filtrate was separated and dried over sodium sulfate to obtain 20 grams of an amber-colored liquid. The vapor phase chromatography of this liquid gave 21.1 and 5.3 wt. percent or 8.6 and 4.5% (recovered) yield of VII and 1,2-ethanedithiol, respectively.

EXAMPLE 3

1,4,6,9-tetrathiaspiro[4.4]nonane (VII) from V 1,4,6,9-tetrathiaspiro[4.4]nonane was prepared from V in the identical procedure of Example 2 except that 40.6 grams (0.25 mole) of V was substituted for II and a temperature rise from 5° to 30° C. resulted upon the addition of the reactants. The product VII, M.P. 139–141° C., was obtained in 59.3% yield. After recrystallization from ethyl alcohol, it melted at 142°–143° C. A mixture melting point with the product obtained from Example 2 was not depressed, and the infrared spectra of the two were superimposable. Analysis gave 65.28% sulfur as compared to 65.31% calculated for C$_5$H$_8$S$_4$.

The separated organic layer from the filtrate (12 grams) gave 34.2 and 18.0 wt. percent or 8.4 and 9.2% yield (recovered) of VII and 1,2-ethanedithiol, respectively.

EXAMPLE 4

1,4,6,10-tetrathiaspiro[4,5]decane (VIII) from II and 1,3-propanedithiol

To 100 grams (1.0 mole) of 36.5% hydrogen chloride-methanol solution at 5° C., 36.1 grams (0.15 mole) of II and 27.1 grams (0.25 mole) of 1,3-propanedithiol were added in one portion. After removal of ice cooling, an exothermic reaction set in causing a temperature rise from 5° to 45° C. over a 3-minute period. The stirred reaction mixture was heated at reflux for 22 hours. After cooling to 0° C., 200 ml. of water was added dropwise at 0°–10° C. This was followed by the dropwise addition of 75 grams of concentrated ammonium hydroxide at 0°–10° C. The reaction mixture was stirred at 0°–10° C. for 30 minutes. Since no solids were present, the bottom amber liquid was separated and dried over sodium sulfate. This liquid (43 grams) was resolved by vapor phase chromatography to give 12.5, 8.1, 40.8, 0.9, and 9.0 wt. percent or 9.6, 7.1, 33.4, 1.6, and 14.3% yield (recovered) of VI, VII, VIII, 1,2-ethanedithiol, and 1,3-propanedithiol, respectively. The mixture melting point of VI and VII obtained from the vapor phase chromatogram with authentic samples of VI and VII was not depressed, and the infrared spectra of the samples were superimposable. The melting point of VIII was 129°–130° C. and its elution time was intermediate to VI and VII. The infrared spectrum of VIII had most of the absorption bands common to either VI or VII in the C—H stretching, C—H deformation, and skeletal regions: 2980(m.) and 2900(m.) (C—H st.), 1422(s.), 1417(m.), (CH$_2$def.), 1274(s.), 998(m.), 966(w.), 947(m.), 905(m.), 877(s.), and 842(m.) cm.$^{-1}$.

EXAMPLE 5

VIII from III and 1,2-ethanedithiol

To 100 grams of 36.5% hydrogen chloride-methanol solution at 5° C., 39.6 grams (0.25 mole) of III, and 23.5 grams (0.25 mole) of 1,2-ethanedithiol were added in one portion. Upon the removal of external cooling, an exothermic reaction set in causing a temperature rise from 5° to 40° C. over a 10-minute period. The reaction mixture was stirred at 25°–30° C. for 22 hours. After cooling to 0° C., 200 ml. of water was added dropwise at 0°–10° C. To the stirred reaction mixture 75 grams of concentrated ammonium hydroxide was added dropwise at 0°–10° C. After stirring the reaction mixture at 0°–10° C. for 30 minutes, the resulting precipitate was collected by filtration and air-dried at 25°–30° C. The product mixture (28 grams) which contained VI, VII, and VIII melted at 103°–110° C. This mixture was resolved by vapor phase chromatography to give 6.0, 47.4, and 36.7 wt. percent or 3.0, 27.1, and 19.6% yield of VI, VII, and VIII, respectively. The bottom amber liquid of the filtrate was separated and dried over sodium sulfate. This liquid (23 grams) was resolved by vapor phase chromatography to give 10.2, 11.4, 21.7, and 11.8 wt. percent or 4.2, 5.3, 9.5, and 10.0% yield of VI, VII, VIII, and 1,3-propanedithiol, respectively.

The charge and procedure was identical as described above except the stirred reaction mixture was heated at 73°–75° C. for 22 hours. Under these conditions, 13 grams solid, M.P. 113°–116° C., and 35 grams of an amber-colored liquid were obtained. The vapor phase chromatogram of this mixture furnished the following data:

| Compound No.: | Source | Wt. percent | Percent yield |
|---|---|---|---|
| VI | Solid | 9.1 | 2.1 |
|  | Liquid | 10.5 | 6.6 |
| VII | Solid | 46.5 | 12.3 |
|  | Liquid | 13.0 | 9.3 |
| VIII | Solid | 38.2 | 9.5 |
|  | Liquid | 22.4 | 14.9 |
| HSCH$_2$CH$_2$SH | do | 0.4 | [1] 0.6 |
| HS(CH$_2$)$_3$SH | do | 17.6 | 22.8 |

[1] Recovered.

EXAMPLE 6

VIII from VI and 1,2-ethanedithiol

To 80 grams (0.8 mole) of 36.5% hydrogen chloride-methanol solution at 5° C., 44.9 grams (0.2 mole) of VI and 18.9 grams (0.2 mole) of 1,2-ethanedithiol were added in one portion. External ice cooling was removed and the temperature of the stirred reaction mixture was allowed to reach 25° C. over a 30-minute period. The stirred reaction mixture was heated at reflux for 22 hours. After cooling to 0° C., 160 ml. of water was added dropwise at 0°–10° C. over a 15-minute period. This was followed by the dropwise addition of 60 grams of concentrated ammonium hydroxide at 0°–10° C. The stirred reaction mixture was stirred at 0°–10° C. for 30 minutes. The reaction mixture was filtered. Since no solids were present, the bottom amber liquid was separated and dried over sodium sulfate. This mixture (59 grams) was resolved by vapor phase chromatography and the following data were obtained:

| Compound No.: | Wt. percent | Percent yield |
|---|---|---|
| VI | 12.6 | [1] 16.6 |
| VII | 9.5 | 14.3 |
| VIII | 22.7 | 31.8 |
| HSCH₂CH₂SH | 1.9 | [1] 6.0 |
| HS(CH₂)₃SH | 28.2 | 76.9 |

[1] Recovered.

The mixture melting point of VI, VII, and VIII obtained from the vapor phase chromatogram with authentic samples of VI, VII, and VIII was not depressed, and the infrared spectra of the samples were superimposable.

EXAMPLE 7

VIII from VII and 1,3-propanedithiol

The charge for this reaction was the same as Example 6 except 39.3 grams (0.2 mole) of VII and 21.7 grams (0.2 mole) of 1,3-propanedithiol were substituted for VI and 1,2-ethanedithiol. The procedure was identical to Example 6 except 19 grams solid, M.P. 124°–128° C., and 35 grams of an amber-colored liquid were obtained. The solid and amber liquid were resolved by vapor phase chromatography, and the following data were obtained:

| Compound No.: | Source | Wt. percent | Percent yield |
|---|---|---|---|
| VI | Solid | None | None |
|  | Liquid | 2.2 | 1.7 |
| VII | Solid | 61.3 | [1] 29.7 |
|  | Liquid | 19.7 | [1] 17.6 |
| VIII | Solid | 17.8 | 8.0 |
|  | Liquid | 16.8 | 14.0 |
| HSCH₂CH₂SH | do | 8.4 | 15.6 |
| HS(CH₂)₃SH | do | 29.7 | [1] 48.0 |

[1] Recovered.

The vulcanization of rubber is accelerated by tetrathiaspiroalkanes produced by the process described herein. For such purpose it is preferred to employ products produced by reacting a compound of the formula

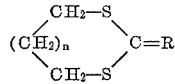

where $n$ is an integer from zero to eight, inclusive, and R is $$=N-C\equiv N \text{ or } =N-\overset{\overset{O}{\|}}{C}-NH_2$$

with an alkylene or phenylene dithiol. Accelerating vulcanization is illustrated by addition of VI and VII, respectively, to rubber. Tests were conducted in a stock comprising

| | Parts by weight |
|---|---|
| Natural rubber | 100 |
| High abrasion furnace black | 50 |
| Stearic acid | 3 |
| Zinc oxide | 5 |
| Hydrocarbon softener | 3 |
| Sulfur | 2.5 |
| Accelerator | 0.5 |

The stocks so compounded were heated in the usual manner in a press at 144° C.

| | Cure time in mins. | Modulus of elasticity at 300% elongation in lbs./in.² | Tensile at break in lbs./in.² | Ultimate elongation, percent |
|---|---|---|---|---|
| Accelerator: | | | | |
| VI | 120 | 820 | 1,200 | 400 |
| VII | 120 | 700 | 1,500 | 520 |

It is intended to cover all changes and modifications of the examples of the invention herein chosen for purposes of disclosure which do not constitute departures from the spirit and scope of the invention.

What is claimed is:

1. The process which comprises reacting a compound of the formula

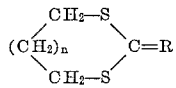

where $n$ is an integer zero to eight, inclusive, and R is $=N-C\equiv N$ or

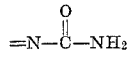

with an alkylene or phenylene dithiol in alcoholic hydrogen chloride and isolating a tetrathiaspiro compound.

2. The process of claim 1 wherein the dithiol is HSCH₂(CHC₂)ₙ·CH₂SH where $n'$ is an integer zero to eight, inclusive.

3. The process of claim 1 where $n$ is zero or one, R is $=N-C\equiv N$, the alcohol is methanol, and the dithiol is HSCH₂(CH₂)ₙ·CH₂SH where $n'$ is zero or one.

References Cited

D'Amico, et al., C.A. 67: 64328d (1967).

JOHN D. RANDOLPH, Primary Examiner

C. M. SHURKO, Assistant Examiner

U.S. Cl. X.R.

260—784